United States Patent [19]

Gammenthaler

[11] Patent Number: 4,601,059

[45] Date of Patent: Jul. 15, 1986

[54] COMMUNICATIONS CONTROL CIRCUIT WITH ADAPTIVE TIMING

[76] Inventor: Robert S. Gammenthaler, 2030 Avenue G., Suite 1108, Plano, Tex. 75074

[21] Appl. No.: 595,912

[22] Filed: Apr. 2, 1984

[51] Int. Cl.$^4$ .......................... H04B 1/00; H04Q 7/00
[52] U.S. Cl. ......................................... 455/54; 455/34
[58] Field of Search ................. 455/54, 56, 33, 34; 179/2 EB

[56] References Cited

U.S. PATENT DOCUMENTS

| | | | |
|---|---|---|---|
| 4,347,626 | 8/1982 | Wenzel | 455/54 |
| 4,395,594 | 7/1983 | Meyerle | 455/34 |
| 4,400,585 | 8/1983 | Kaman et al. | 179/2 EB |

*Primary Examiner*—Jin F. Ng
*Assistant Examiner*—Curtis Kuntz
*Attorney, Agent, or Firm*—Hubbard, Thurman, Turner & Tucker

[57] ABSTRACT

A communications control circuit including a monitor circuit for receiving transmissions of a first and second frequency from a base radio station to other radio stations and measuring several time intervals, each time interval being the time from the end of a first frequency transmission to the end of a second frequency transmission. The two frequency transmissions are a portion of the signal protocol required by the base radio station to establish a communications link between a radio station and a base radio station. The control circuit further includes logic circuitry for computing an estimated delay time used in delaying the transmission of an identification code to the base station to establish the communication link after the end of the first frequency transmission. The estimated delay time is computed from monitoring other successful radio station protocol exchanges with the base station and measuring similar delay times and adjusting the delay time iteratively based upon the monitored delay times and any deviation between these monitored delay times and the estimated delay time.

15 Claims, 4 Drawing Figures

4,601,059

COMMUNICATIONS CONTROL CIRCUIT WITH ADAPTIVE TIMING

BACKGROUND

1. Field of the Invention

This invention relates to control circuitry for communication devices and specifically to control circuitry for performing signal protocol exchanges to establish a communications link between two radio stations.

2. Description of the Prior Art

Mobile telephone equipment has existed for some time and enables a mobile radio station including a transmitter and receiver to communicate with a base station which also includes a transmitter and receiver. Mobile telephones more specifically allow the interaction of a number of separate mobile radio stations with a single base station over several different frequency channels. The mobile stations establish a communications link with the base station by first determining when the base station is available and second by performing a handshake or signal protocol exchange with the base station to establish the identification of the mobile unit calling and to establish the number to be called. Several types of signal protocols exist for mobile telephone equipment. One such system is the Improved Mobile Telephone Services (IMTS). The interaction of the IMTS mobile units with base stations is outlined in the Bell System Technical Reference, PUB 43301 entitled "Bell System Domestic Public Land Mobile Radio Services-Interface Specifications For Customer-Provided Mobile Terminals".

Usually, to interface with a base station, the mobile station must have a full duplex capability, i.e. be able to transmit and receive at the same time. This capability enables the mobile station to receive protocol signals from the base station and transmit response signals in accordance with the appropriate protocol. However, half duplex equipment, i.e. equipment that can only transmit or receive at any instant, is much cheaper to manufacture. Half duplex equipment has been used in place of full duplex equipment with base stations that require signal hand shaking or protocol exchanges by sending the required response signals at estimated time intervals to simulate reception and response to protocol signals from the base radio station. If the time intervals are proper, the mobile station will look to the base station as if it is responding properly to the signal protocol. In fact, the signals that are being transmitted by the mobile stations are in accordance with time estimates designated by the circuit designer for simulating the signal protocol exchange required by the base station. Unfortunately, not all base station signal protocols are uniform. These base station protocols vary from base station location to base station location. If the time interval estimates do not fall within the base stations signal protocol limits, the communications link between the base station and the mobile station will not be established. Therefore, the time intervals for the mobile units may have to be adjusted each time the mobile unit interfaces with a different base station. However, one advantage of mobile communication, i.e. the ability to travel and communicate with different base stations is lost.

It is the object of the present invention to provide a control circuit for use in mobile radio units that provides time intervals for half duplex systems that adapt to the time interval protocol requirements of individual base stations.

SUMMARY OF THE INVENTION

In accordance with the present invention a communications control circuit is provided that includes a monitor circuit for receiving transmissions of a first and second frequency, a timing circuit for measuring a timing interval, the interval being the time from the end of the transmission of the first frequency to the end of the transmission of the second frequency, and a logic circuit for controlling the transmission of a response signal after a time delay, where the time delay is a function of the measured time intervals.

In a preferred embodiment, a mobile communications control circuit is provided that includes a monitor for receiving transmissions of a first and second frequency from a base station to other mobile units and measuring a time interval, the interval being the time from the end of the first frequency transmission to the end of the second frequency transmission. The control circuit also includes a logic circuit for controlling the transmission of a response signal to the base station to establish a communications link in accordance with the base station signal protocol, wherein the transmission of the response signal is made after a time delay, where the time delay is computed as a function of the measured time intervals.

In this preferred embodiment, the first frequency transmission is an IDLE signal and the second frequency transmission is a SEIZE signal. Both are transmitted from the base station. The mobile transmitter is required to transmit a connect signal for a specific time and then after a time delay to transmit the mobile unit identification code. The time delay is based upon the time interval between the end of the IDLE signal and the end of the transmission of the SEIZE signal from the base station. A further delay is added to the time interval to arrive at the time delay between the end of the IDLE transmission from the base station to the beginning of the identification code transmission by the mobile unit.

In a further preferred embodiment, an estimate of the time interval based upon the measured time intervals is established by the logic circuitry. This time interval estimate is iteratively adjusted by comparing a previous time interval estimate against the most recent measured time interval and adjusting the time interval estimate in accordance with the difference. In this embodiment, a fraction of the difference is combined with the previous time interval estimate to produce the new time interval estimate. However, the magnitude of this fraction varies with the magnitude of the difference. A large difference results in a smaller portion of that difference being combined with the previous time interval estimate. On the other hand, a small difference will result in a larger portion of that difference being combined with the previous time interval estimate.

In this preferred embodiment, a multi-channel system is used and the logic circuitry provides an interval time estimate for each channel of the multi-channel system. Furthermore, these channels are only monitored for a specific number of intervals to adjust the interval time estimate. After the specified number of intervals have been measured, the interval time estimate is no longer adjusted. In addition, these channels are not monitored when certain signal conditions occur such as continuous wave frequency transmissions by the base station which would result in an improper adjustment of the time estimates.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DESCRIPTION OF THE PREFERRED EMBODIMENT

This invention includes a communications control circuit for a mobile radio unit to interface with a base radio unit in accordance with the IMTS system as described in the Bell System Technical Reference PUB 43301 entitled "Bell System Domestic Public Land Mobile Radio Services Interface Specifications for Customer-Provided Mobile Terminals" herein incorporated by reference. In this preferred embodiment, the mobile unit includes a half duplex system, i.e. the unit can only transmit or receive at any one time.

Figure 1:
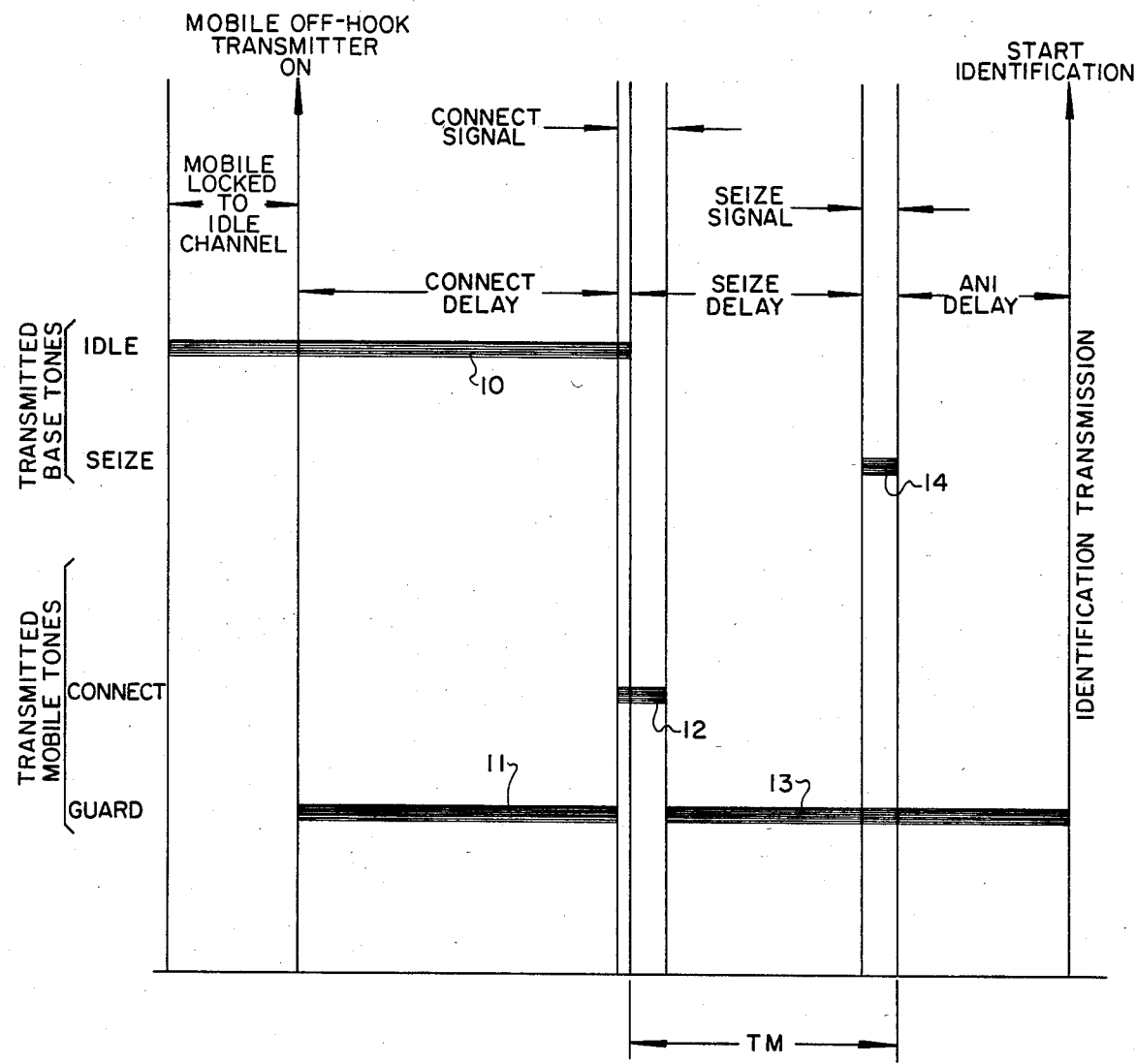
FIG. 1 is a timing diagram illustrating a portion of the signal protocol for the IMTS system.

FIG. 1 illustrates a portion of the signal protocol required for an IMTS system. When the base station is not busy on a specific channel, the base station transmits an IDLE tone 10, at a preselected frequency. For a mobile unit to establish a communications link with the base station, the mobile unit must transmit a GUARD signal 11, for a specific time followed by a CONNECT signal 12. In response to receiving the CONNECT signal 12, the base station will cease transmission of the IDLE signal 10. At the end of the transmission of the CONNECT signal 12, the mobile unit continues to transmit the GUARD signal 13. During the transmission of the GUARD signal 13, the base station transmits a SEIZE signal 14, to signify the establishment of a communications link with the base station. After a time delay (ANI DELAY) the mobile unit stops transmitting the GUARD signal 13 and transmits the identification code. If the transmission of the identification code by the mobile unit is not made within the proper time, the communications link with the base station is terminated by the base station. The ANI DELAY is a constant that may be designed into the mobile unit control circuitry. However, the time between the end of the IDLE transmission 10 and the SEIZE signal transmission 14 is a function of the base station circuitry.

In a full duplex mobile unit, the unit is able to receive the SEIZE signal 14 while continuing to transmit the GUARD signal 13 and then continue the transmission of the GUARD signal 13 for the ANI DELAY time. Thus, variances in the time of SEIZE signal transmission 14 are not critical since the full duplex unit will wait until after it receives this SEIZE signal transmission 14 to continue the GUARD signal 13 for the ANI DELAY time.

In a half duplex mobile unit, the unit is only able to either transmit or receive at any one time. Therefore, a half duplex system cannot detect the base station transmission of the SEIZE signal 14 while it is transmitting the GUARD signal 13. The half duplex system can broadcast the GUARD signal 13 for a time Tm plus the ANI DELAY time to make it appear as if it received the SEIZE signal 14 and is responding with the GUARD signal 13 for the appropriate ANI DELAY time. The Tm time is a function of the base station control circuit and if the half duplex mobile unit uses the wrong Tm then communications with the base station will not be established. When the half duplex mobile units travel to different base stations, establishing communications can be a problem because of the different control circuit characteristics of each base station resulting in different values of Tm. Therefore, estimating the time Tm becomes a function of each individual base station control circuit. Without an appropriate Tm and ANI DELAY total time estimate, a half duplex mobile unit will have difficulty establishing a communications link with the base station. The purpose of this invention is to provide an appropriate method of automatically estimating Tm to allow a half duplex mobile station to establish a communications link with different base stations. Accordingly, the Tm for each base station must be adapted to the characteristics of that base station.

Figure 2:
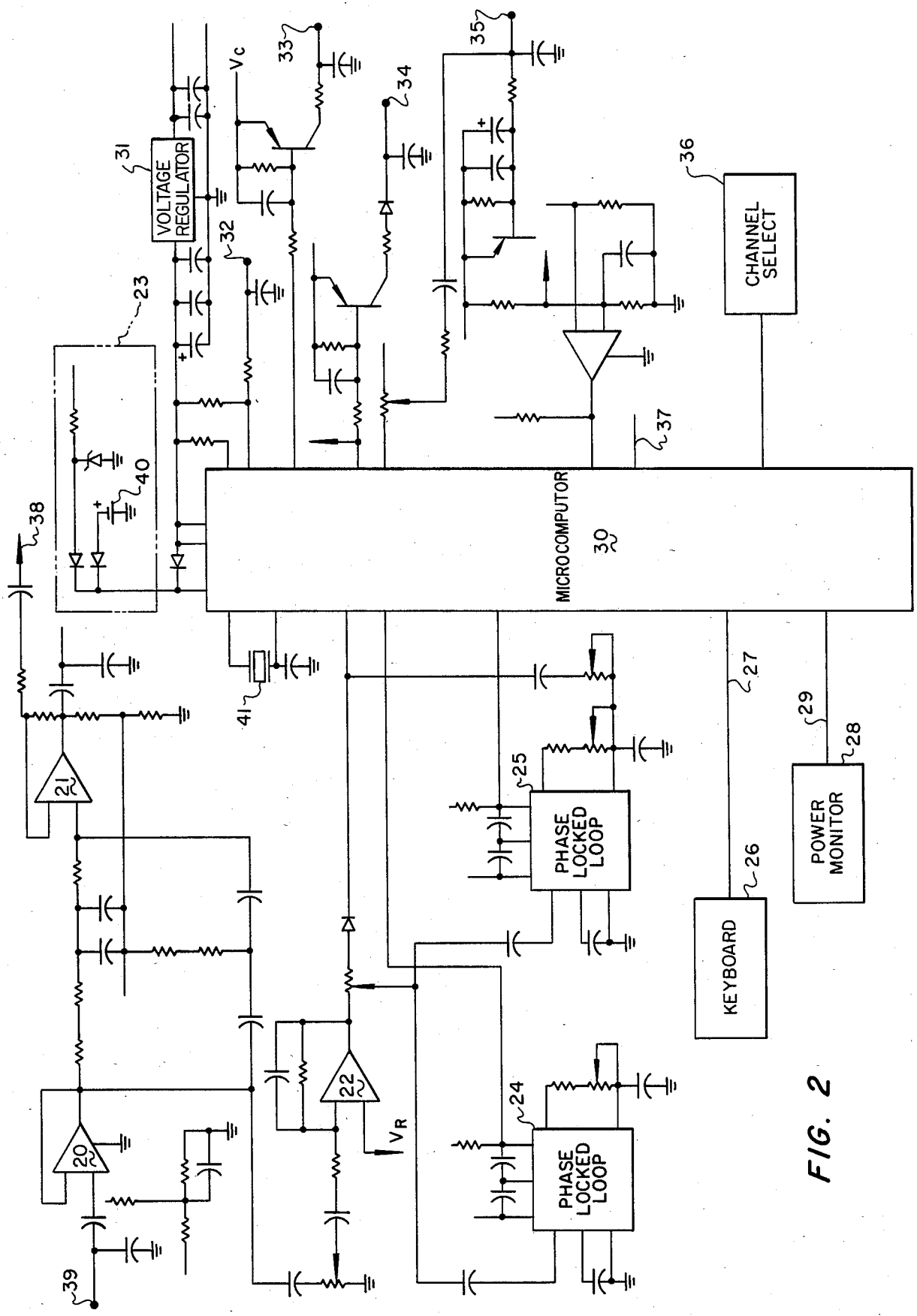
FIG. 2 is a schematic diagram of the communications control circuit.

FIG. 2 illustrates a schematic diagram of the communications control circuit of a mobile unit for the present invention. The control circuit is connected to the receiver and transmitter circuitry for controlling duplex operations. The circuit receives an audio signal at node 39 from the radio. This audio signal is buffered through an amplifier 20 and coupled to a notch filter including operational amplifier 21 and related circuitry. The audio is then returned to the mobile unit via node 38. The output of the buffer amplifier 20 is connected to the input of a high pass, low pass audio amplifier 22 with related circuitry. The output of the high pass, low pass audio amplifier 22 is coupled to two phased lock loop tone detectors 24 and 25. Tone detector 24 produces a signal on line 45 when the SEIZE tone has been received. Tone detector 25 produces a signal on line 46 when the IDLE tone has been received. It should be noted that these two signals are present only when the control circuitry is in a monitor mode since the mobile unit is a half duplex system which cannot receive while transmitting. Microcomputer 30 further includes a keyboard 26 input on line 27 and a power monitor 28 input on line 29. The power monitor provides a reset signal 40 to microcomputer 30 if the power voltage to microcomputer 30 falls below a minimum value. Microcomputer 30 is further connected to a crystal 41 which provides timing and a tone frequency. The circuitry within block 23 includes a lithium battery 40 and provides backup power to microcomputer 30 which provides standby power to the random access memory RAM on board microcomputer 30 to maintain the data in microcomputer 30 when power to microcomputer has been removed. The power circuitry includes a voltage regulator 31 connected with several capacitors as shown to provide the regulated power source to microcomputer 30.

Microcomputer 30 provides an output on line 32 to key the transmitter. Output node 33 is provided, in the preferred embodiment, to light an LED (light emitting diode) to indicate a busy channel. An output is provided at node 34 to a speaker to provide an audible feedback to keyboard entries and to further provide an electronic simulated telephone ringing sound when a call is received by the mobile unit. The transmitting audio signaling tones shown in FIG. 1, are output on node 35 from the microcomputer 30. Line 37 contains the mute signal which controls the squelch in the radio and further controls the receiver audio such that the audio is only present when the mobile unit is accessing the channel. Channel select circuitry 36 is provided to select the channel for use by the mobile unit. In the preferred embodiment, the microcomputer unit 30 is a CMOS Intel 8049 disclosed in *The MCS-48 Family of Single Chip Microcomputers User Manual*, dated September, 1980 and herein incorporated by reference.

During operation, the microcomputer 30 monitors the SEIZE and IDLE signals on line 45 and 46 from other mobile units communicating with the base station to determine Tm. From these samples of Tm, an estimated time interval is established that is added to the ANI delay to determine the time delay for the transmitter to begin transmission of its identification code in accordance with the IMTS signal protocol.

Figure 3A:
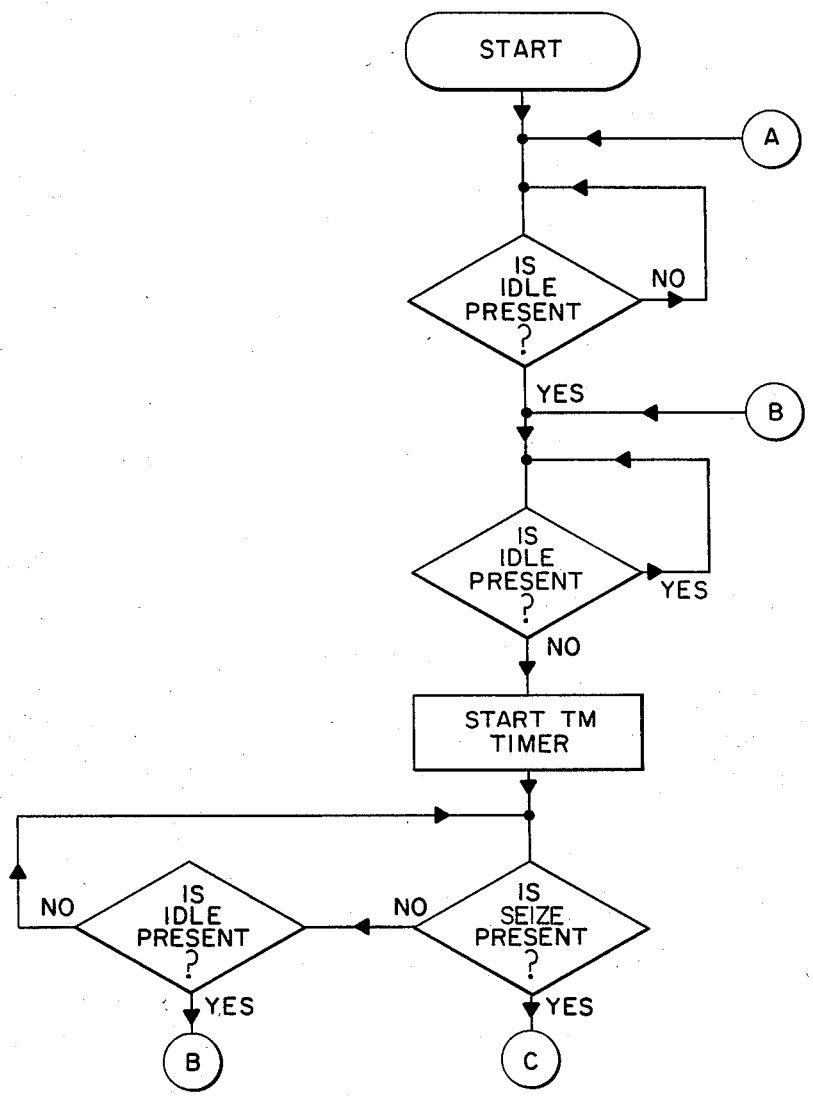
FIG. 3A is a flowchart of the control software that initiates the time interval measurements.
Figure 3B:
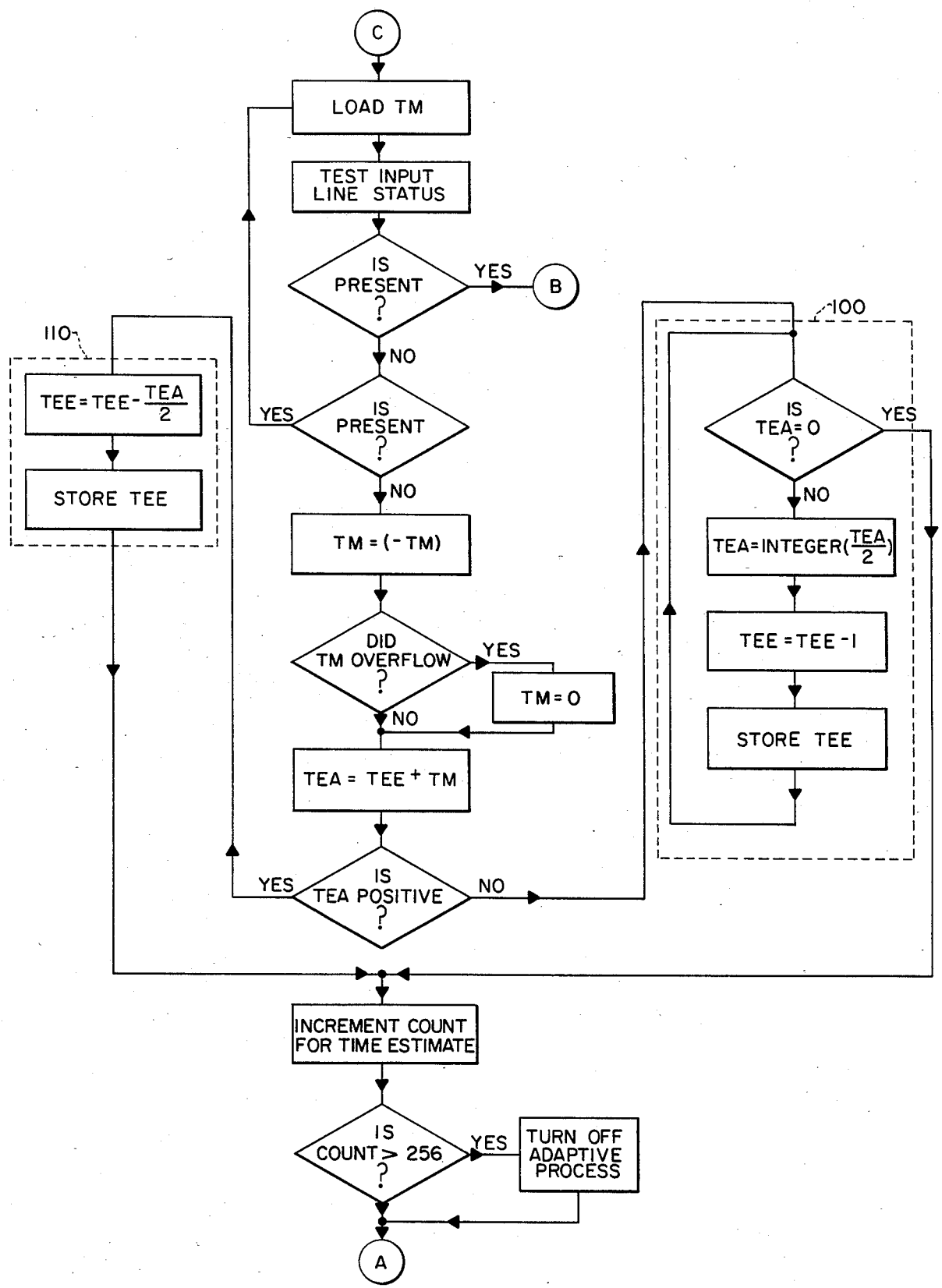
FIG. 3B is a flowchart of the software that adjusts the interval time estimates.

The software contained in microcomputer 30 that establishes the time interval estimate is shown in flowchart form in FIGS. 3A and 3B. The software for adjusting the time interval estimate (illustrated in FIG. 3B), which is an assembly language listing of the relevant portion of the Intel 8049 Intel microcomputer code.

Referring to FIG. 3A, the computer program examines channels for the presence of the IDLE signal. If the IDLE signal is not present then the computer program may look for the presence of the IDLE signal on other channels. Once an IDLE signal is located, the program waits for the IDLE signal to end. Upon the end of the IDLE signal the TM timer is started and the channel is checked for the presence of the SEIZE signal. If the SEIZE signal is not present, then the presence of the IDLE signal is checked and if the IDLE signal is present then an error condition has occurred and the time interval measurement is aborted by starting the procedure at point B as shown. If the IDLE signal is not present then the program waits for the SEIZE signal to occur. Once the SEIZE signal occurs then the program enters the time estimate adaptive process at point C. It should be understood that this software illustrated in FIG. 3A does perform other tasks not related to the time estimate and adaptive process and, therefore, these other tasks are not illustrated.

In FIG. 3B, the program begins the adaptive process by inputting TM. After TM is input, the program checks to see that the IDLE and SEIZE signals are in the proper state. If the IDLE signal is present, the monitored communication link has been aborted and the program restarts the procedure at point B (FIG. 3A). If the SEIZE signal is still present then the program waits for the end of the SEIZE signal. Once the end of the SEIZE signal occurs, the quantity TM is negated and checked for an overflow condition. If TM has overflowed when negated, then TM is set to zero. The difference between the measured time TM and the previously estimated time TEE is computed as TEA. If TEA is positive, then TEE is adjusted by ½ of the difference and stored as shown in block 110.

If, on the other hand, TEA is negative then the program enters a loop (block 100) that approximates a base two logrithmic compression of the error for adjusting TEE. TEE is actually adjusted incrementally by this loop by right shifting the binary integer value of TEA and decrementing the value of TEE once per pass until TEA is zero. The result of this logrithmic compression is that for a small difference, a relatively large portion of the magnitude of the difference is used to adjust the estimate whereas for a large difference, a relatively smaller portion of the magnitude of the difference is used to adjust the estimate. This is because in a half duplex operation, if the TM estimate is too small the base station will abort the communications link. However, the base station is more tolerant if the estimate of TM is too large. According, the adaptive software provides for a larger adjustment (i.e. per adjustment iteration) when the TM estimate is increased (block 110) rather than when the TM estimate is being decreased (block 100).

At the end of the adjustment to TEE, the adaptive program count or count for the time estimate is incremented. If the count is greater than 256 then the adaptive process is stopped. In other words, monitoring of that channel to compute new TMs will cease. In either manner, program control is returned to the control software at point A (see FIG. 3A).

Software not shown in FIGS. 3A and 3B also provides for the adaptive process to be turned off when the IDLE and SEIZE signals are in certain states, such as a continuous waveform. This prevents the estimated time interval from being adjusted erroneously.

Although the preferred embodiment of this invention has been described here in detail, it should be understood that various changes, alterations, and substitutions may be made therein without departing from the spirit and scope of the invention as defined by the appended claims.

What is claimed is:

1. A communications unit comprising:
   receiver means for receiving transmissions of a first and second frequency;
   transmitting means for transmitting a response signal;
   timing means for measuring a plurality of time intervals, each time interval being the time from the end of the transmission of the first frequency to the end of the transmission of the second frequency; and
   logic means for actuating said transmission means after a computed time delay from the end of the transmission of the first frequency, said time delay being computed by said logic means as a function of the time interval measurements, whereby the time of transmission of the response signal after receipt of said transmission of the second frequency is determined by the time interval between the transmission of said first and second frequencies.

2. A mobile communications control circuit for interacting with a base station to establish communications in accordance with a prescribed signal protocol, said circuit comprising:
   monitor means for receiving signal protocol transmissions from other mobile units, said signal protocol transmissions including base station transmissions of a first signal and a second signal, and for measuring from each of said signal protocol transmissions a time interval, being a time from the end of the first signal transmission to the end of the second signal transmission;
   logic means connected to said monitor means for computing a time delay as a function of the measured time intervals; and
   transmission means for sending a third signal in accordance with the protocol established by said signal protocol transmissions after said time delay from the end of the first signal transmission.

3. A mobile communications control circuit according to claim 2 wherein said logic means further includes a time delay determination means for computing the time delay based upon a fixed constant added to a time interval estimate, said time interval estimate being iteratively adjusted in accordance with deviations of said time interval estimate and said time interval measurements from said monitor means.

4. A mobile communications control circuit according to claim 3 wherein said time delay determination means includes deviation computation means for adjusting said time interval estimate by combining an initial time interval estimate with a portion of the difference between said initial time interval estimate and one of said time interval measurements from said monitor means.

5. A mobile communications control circuit according to claim 4 wherein the magnitude of the portion of the difference between said initial time interval estimate and said time interval measurement varies as a function of the magnitude of the difference.

6. A mobile communications control circuit according to claim 5 wherein said monitor means measures a specified number of time intervals.

7. A mobile communications control circuit according to claim 6 further including an input means connected to said logic means and wherein said adjustment of said time interval estimate is user controlled from said input means.

8. A mobile communications control circuit according to claim 7 wherein an adjustment of said time interval estimate may be disabled by said logic means when said monitor means has received one or more specific signals for a length of time that exceeds a specified time limit.

9. A mobile communications unit comprising:
receiving means for receiving audio and control signals at specific frequencies from a base station;
transmitting means for transmitting audio and control signals to said base station, said control signals including an identification code of said mobile communications unit;
monitoring means connected to said receiving means for receiving first and second control signals from said base stations in communications with other mobile units and determining for each other mobile unit communications a time interval that is substantially the time from the end of a first frequency transmission received from said base station to the end of a second frequency transmission received from said base station; and
logic means for initiating, after a computed time delay, the transmission of the identification code to the base station to establish communications between said base station and said mobile communications unit, said computed time delay being computed by said logic means as a function of said measured time intervals from said monitor means.

10. A mobile communications unit according to claim 9 wherein said logic means further includes a time delay determination means for computing the time delay based upon a fixed constant added to a time interval estimate with said time interval estimate being adjusted in accordance with deviations of said time interval estimate from said measured time intervals from said monitor means.

11. A mobile communications unit according to claim 10 wherein said time delay determination means includes deviation computation means for iteratively adjusting said time interval estimate by combining an initial time interval estimate with a portion of the difference between said initial time interval estimate and one of said measured time intervals from said monitor means.

12. A mobile communications unit according to claim 11 wherein the portion of the difference between said initial time interval estimate and said measured time interval varies as a function of the magnitude of the difference.

13. A mobile communications unit according to claim 12 wherein said monitor means measures a user specified number of time intervals.

14. A mobile communications control circuit according to claim 13 further including an input means connected to said logic means and wherein said adjustment of said time interval estimate is user controlled from said input means.

15. A mobile communications unit according to claim 14 wherein said adjustment of said time interval estimate may be disabled by said logic means when said monitor means receives a frequency transmission from said base station for a time that exceeds a specific time limit.

* * * * *